US012686538B2

(12) United States Patent
Yu et al.

(10) Patent No.: US 12,686,538 B2
(45) Date of Patent: Jul. 21, 2026

(54) BOTTLE SOLENOID VALVE

(71) Applicant: ZHEJIANG DUNAN ARTIFICIAL ENVIRONMENT CO., LTD., Shaoxing (CN)

(72) Inventors: Zhou Yu, Shaoxing (CN); Kepeng Zhang, Shaoxing (CN); Zhijun Kang, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 137 days.

(21) Appl. No.: 18/759,290

(22) Filed: Jun. 28, 2024

(65) Prior Publication Data

US 2024/0351755 A1 Oct. 24, 2024

Related U.S. Application Data

(63) Continuation of application No. PCT/CN2022/125876, filed on Oct. 18, 2022.

(30) Foreign Application Priority Data

Dec. 31, 2021 (CN) .......................... 202111676369.0
Dec. 31, 2021 (CN) .......................... 202123453809.4

(51) Int. Cl.
*B65D 47/24* (2006.01)
*B65D 47/32* (2006.01)
(Continued)

(52) U.S. Cl.
CPC .......... *B65D 47/248* (2013.01); *B65D 47/32* (2013.01); *F16K 24/04* (2013.01); *F16K 31/0651* (2013.01); *F16K 31/0655* (2013.01)

(58) Field of Classification Search
CPC .... B65D 47/248; B65D 47/32; B65D 47/283; B65D 51/1683; F16K 24/04;
(Continued)

(56) References Cited

U.S. PATENT DOCUMENTS 1,326,880 A * 12/1919 Rose ................... B05B 11/1032
222/206
2,772,817 A * 12/1956 Jauch ...................... F04B 43/08
55/432

(Continued)

FOREIGN PATENT DOCUMENTS

CN 207598940 U 7/2018
CN 109715516 A 5/2019
(Continued)

OTHER PUBLICATIONS

First Notice of Reasons for Refusal of JP2024-529746.
International Search Report of PCT/CN2022/125876.

*Primary Examiner* — Bob Zadeh

(57) ABSTRACT

A bottle solenoid valve is provided. The bottle solenoid valve includes a bottle body including a bottle cavity, a first end and a second end, the first end and the second end are provided with a first opening and a second opening that are in communication with the bottle cavity, respectively; a valve body assembly, one end of which is mounted at the first end; a valve core assembly configured for opening/closing a valve port; and a bottle cap including a covering portion covering the second opening and a wrapping portion detachably connected to the second end, the wrapping portion being surrounded around the circumference of the second end, wherein a ventilation channel, one end of which is in communication with the bottle cavity and the other end faces the valve body assembly and is in communication with atmosphere, is formed on the inner surface of the wrapping portion.

17 Claims, 9 Drawing Sheets

B-B

(51) Int. Cl.
  *F16K 24/04* (2006.01)
  *F16K 31/06* (2006.01)

(58) Field of Classification Search
  CPC .. F16K 31/0651; F16K 31/0655; F16K 27/02;
                                                F16K 31/06
  See application file for complete search history.

(56) References Cited

U.S. PATENT DOCUMENTS

| | | | | | |
|---|---|---|---|---|---|
| 4,456,137 | A | * | 6/1984 | Lyman | B65D 41/0471 |
| | | | | | 215/331 |
| 5,052,592 | A | * | 10/1991 | Wilken | B65D 83/765 |
| | | | | | 222/391 |
| 5,431,205 | A | | 7/1995 | Gebhard | |
| 5,579,936 | A | * | 12/1996 | Costa | B65D 51/1622 |
| | | | | | 215/261 |
| 5,655,687 | A | * | 8/1997 | Fitten | B65D 1/0276 |
| | | | | | 222/546 |
| 10,273,061 | B1 | | 4/2019 | Lin | |
| 2004/0178232 | A1 | * | 9/2004 | Langlois | A47F 1/03 |
| | | | | | 222/544 |
| 2005/0258125 | A1 | | 11/2005 | Kiehne | |
| 2007/0131719 | A1 | * | 6/2007 | Masuda | B65D 83/765 |
| | | | | | 222/207 |
| 2010/0044397 | A1 | * | 2/2010 | Pang | B65D 37/00 |
| | | | | | 222/481 |
| 2012/0152284 | A1 | * | 6/2012 | Winterton | A45C 11/005 |
| | | | | | 134/18 |
| 2024/0351755 | A1 | * | 10/2024 | Yu | B65D 47/248 |

FOREIGN PATENT DOCUMENTS

| | | |
|---|---|---|
| CN | 216735541 U | 6/2022 |
| JP | H11010010 A | 1/1999 |
| JP | 2009096478 A | 5/2009 |

* cited by examiner

A-A

B–B

BOTTLE SOLENOID VALVE

CROSS-REFERENCE TO RELATED APPLICATIONS

This application is a continuation of international patent application No. PCT/CN2022/125876, filed on Oct. 18, 2022, which itself claims priority to Chinese patent application Nos. 202111676369.0, filed on Dec. 31, 2021, and titled "BOTTLE SOLENOID VALVE", and 202123453809.4, filed on Dec. 31, 2021, and titled "BOTTLE SOLENOID VALVE", the contents of which are hereby incorporated by reference in their entireties.

TECHNICAL FIELD

The present disclosure relates to the field of solenoid valve, in particular, to a bottle solenoid valve.

BACKGROUND

Currently, gas generally enters an essential oil solenoid valve through a tube or an air hole. The disadvantage of the essential oil solenoid valve at present is that essential oil easily blocks or causes leakage in the tube, and the air hole can easily be blocked due to the accumulation of dust in the air holes. Therefore, air intake form of the essential oil solenoid valves in the related art has disadvantages and risks of clogging.

SUMMARY

A bottle solenoid valve is provided according to embodiments of the present disclosure.

A bottle solenoid valve. The bottle solenoid valve includes a bottle body with a first end and a second end opposite to each other, and a bottle cavity is provided inside the bottle body, the first end of the bottle body is provided with a first opening in communication with the bottle cavity, and the second end of the bottle body is provided with a second opening in communication with the bottle cavity; a valve body assembly including a valve cavity, a passage and a valve port, wherein an end of the valve body assembly is disposed on the first end of the bottle body, the valve body assembly is capable of sealing the bottle body, and the passage is in communication with the first opening and the valve cavity; a valve core assembly disposed in the valve cavity, wherein the valve core assembly is capable of moving in the valve cavity and configured for opening/closing the valve port; and a bottle cap including a covering portion and a wrapping portion connected to the covering portion, wherein the covering portion is covered at the second opening, and the wrapping portion is detachably connected to the second end of the bottle body and surrounded around a circumference of the second end of the bottle body. An inner surface of a sidewall of the wrapping portion is provided with a ventilation channel, an end of the ventilation channel is in communication with the bottle cavity, and the other end of the ventilation channel is disposed towards the valve body assembly and in communication with atmosphere.

In some embodiments, an outer surface of a sidewall of the second end of the bottle body is provided with an avoidance groove and at least one communication hole in communication with the avoidance groove and the bottle cavity. When the wrapping portion is connected to the bottle body, the inner surface of the sidewall of the wrapping portion and the avoidance groove surround to form a ventilation cavity, and the ventilation channel is in communication with the bottle cavity via the ventilation cavity and the at least one communication hole.

In some embodiments, the inner surface of the sidewall of the wrapping portion is provided with internal threads, the outer surface of the sidewall of the second end of the bottle body is provided with external threads, and the wrapping portion is threadedly connected to the bottle body via fit between the internal threads and the external threads, wherein the ventilation channel extends along an axis of the internal threads and is disposed on the inner surface of the sidewall of the wrapping portion.

In some embodiments, the inner surface of the sidewall of the wrapping portion is provided with a plurality of ventilation channels, and the plurality of ventilation channels are disposed at intervals along a circumference of the bottle cap.

In some embodiments, an outer surface of the sidewall of the wrapping portion is provided with an antiskid structure.

In some embodiments, the antiskid structure includes protrusions protruding from the outer surface of the sidewall of the wrapping portion; or, the antiskid structure includes grooves disposed on an outer surface of a sidewall of the bottle cap.

In some embodiments, a guidance portion is defined by a part of a side of the covering portion facing the bottle body protruding out, and is configured for guiding a fluid that flows through the covering portion into the bottle body.

In some embodiments, the valve body assembly includes a valve body having the valve cavity and the valve port; and an attractor provided with the passage. An end of the attractor is connected to the valve body, and the other end of the attractor is sealingly connected to the first end of the bottle body, wherein the attractor is configured for attracting the valve core assembly to move.

In some embodiments, the valve core assembly includes a core iron, which is located in the valve cavity and provided with an accommodating cavity, and configured for fitting with the attractor; a sealing member, which is sleeved on an end of the core iron away from the attractor, and configured for opening or closing the valve port; and, an elastic member, which is disposed in the accommodating cavity and an end of the elastic member extends out of the accommodating cavity and abuts against the attractor.

In some embodiments, the bottle solenoid valve further including a coil assembly, wherein the coil assembly is sleeved out of the valve body assembly and connected to the bottle body, and is configured for controlling movement of the valve core assembly.

In some embodiments, the coil assembly includes a fixing frame detachably disposed on the bottle body; and a coil sleeved on the valve body assembly and fixed to the fixing frame.

Details of one or more embodiments of the present disclosure are set forth in the accompanying drawings and description below. Other features, objects, and advantages of the present disclosure will become apparent from the specification, the accompanying drawings, and the claims.

BRIEF DESCRIPTION OF THE DRAWINGS

Reference may be made to one or more of the accompanying drawings for the purpose of better describing and illustrating those embodiments and/or examples of the disclosures disclosed herein. The additional details or examples used to describe the accompanying drawings should not be considered a limitation on the scope of any of the disclosed disclosures, the embodiments and/or examples presently described, and the best mode of these disclosures as presently understood.

Figure 1:
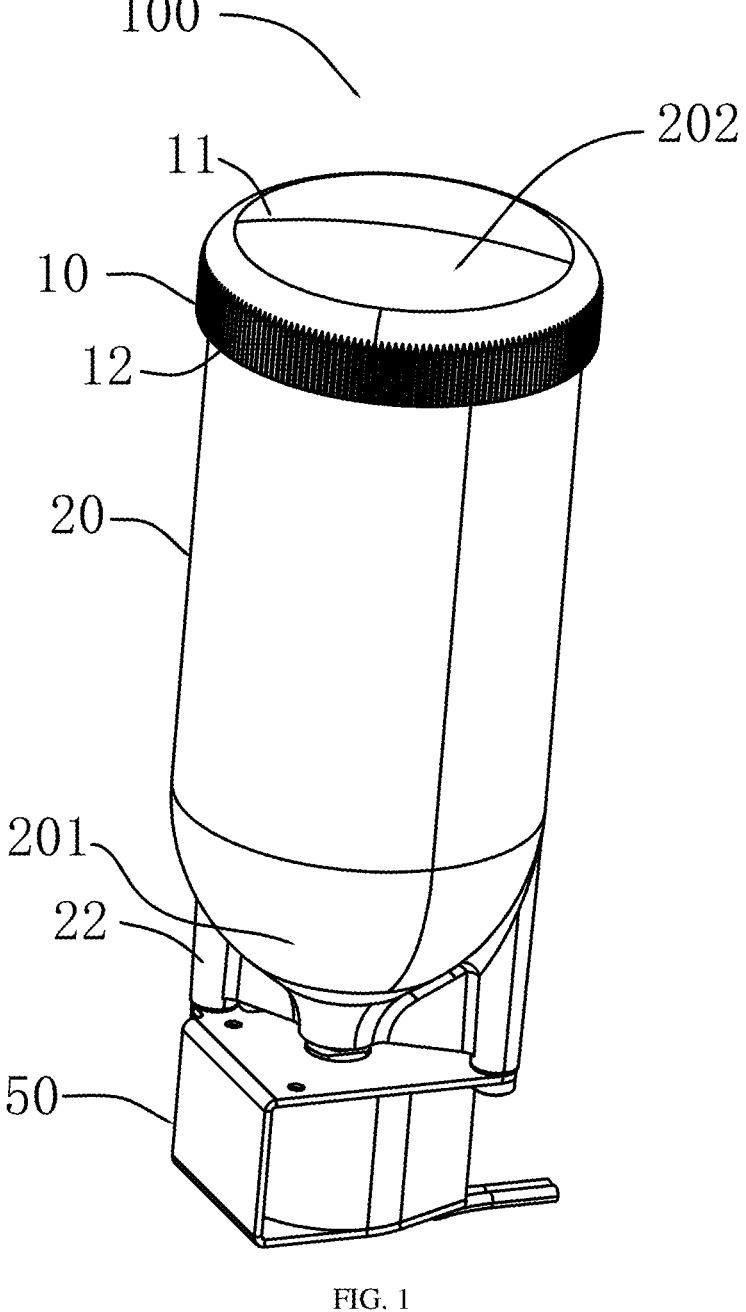
FIG. 1 is a structural schematic diagram of a bottle solenoid valve in an embodiment of the present disclosure.
Figure 2:
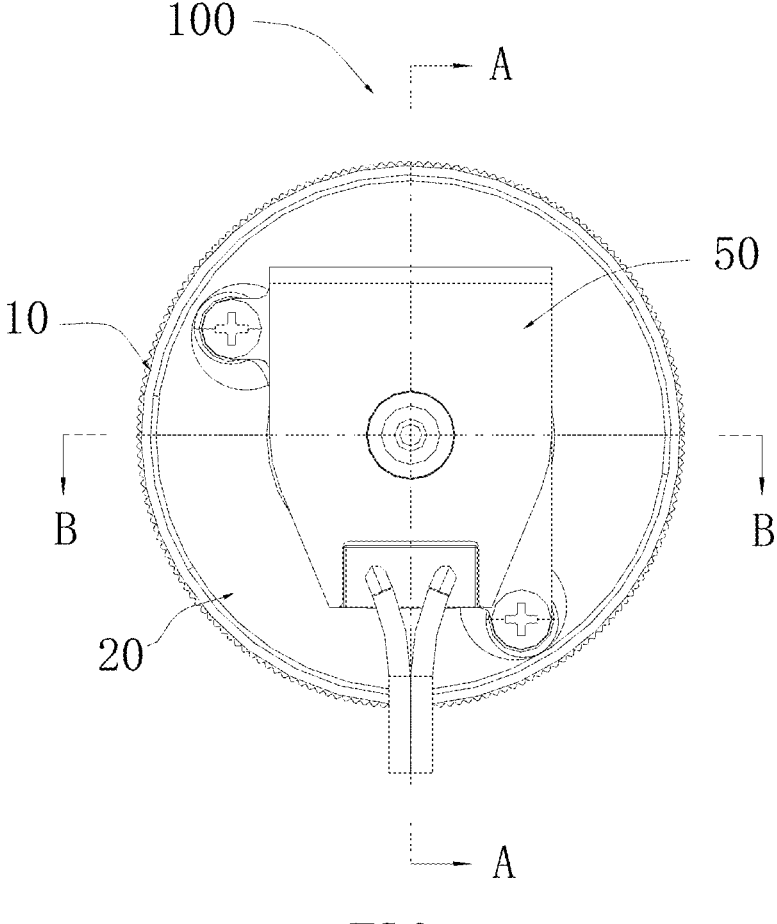
FIG. 2 is a bottom view of the bottle solenoid valve in FIG. 1.

In the figures, 100 bottle represents a solenoid valve; 10 represents a bottle cap; 11 represents a covering portion; 12 represents a wrapping portion; 121 represents internal threads; 122 represents a protrusion; 123 represents a groove; 13 represents a ventilation channel; 14 represents a antiskid structure; 15 represents a guidance portion; 20 represents a bottle body; 201 represents a first end; 202 represents a second end; 21 represents external threads; 22 represents a mounting portion; 23 represents a bottle cavity; 24 represents a first opening; 25 represents a second opening; 26 represents an avoidance groove; 27 represents a communication hole; 28 represents a shrinking portion; 30 represents a valve body assembly; 31 represents a valve cavity; 32 represents a passage; 33 represents a valve port; 34 represents a valve seat; 35 represents a valve body; 36 represents an attractor; 40 represents a valve core assembly; 41 represents a sealing member; 42 represents a core iron; 43 represents an elastic member; 44 represents an accommodating cavity; 50 represents a coil assembly; 51 represents a fixing frame; and 52 represents a coil.

DETAILED DESCRIPTION

The technical solutions in the embodiments of the present disclosure will be clearly and completely described below in conjunction with the accompanying drawings in the embodiments of the present disclosure. Obviously, the described embodiments are only a portion of the embodiments of the present disclosure but not all of the embodiments. Based on the embodiments in the present disclosure, all other embodiments obtained by a person of ordinary skill in the art without making creative labor fall within the scope of protection of the present disclosure.

It is noted that when an element is said to be "disposed" on another element, it may be disposed directly on the other element or there may be a centered element. When an element is said to be "set on" another element, it may be set directly on the other element or there may be both centered elements. When an element is considered to be "fixed to" another element, it may be fixed directly to the other element or there may be both centered elements.

Unless otherwise defined, all technical and scientific terms used herein have the same meaning as commonly understood by those skilled in the art of this disclosure. Terms used in the specification of this disclosure are used only for the purpose of describing specific embodiments and are not intended to limit this disclosure. The terms "and/or"

as used herein include any and all combinations of one or more of the relevant listed items.

Referring to FIG. 1 to FIG. 9, the present disclosure provides a bottle solenoid valve 100. The bottle solenoid valve 100 includes a bottle cap 10, a bottle body 20, a valve body assembly 30, a valve core assembly 40 and a coil assembly 50. The bottle body 20 includes a first end 201 and a second end 202 opposite to each other, and a bottle cavity 23 is provided inside the bottle body 20. The first end 201 of the bottle body 20 is provided with a first opening 24 in communication with the bottle cavity 23, and the second end 202 of the bottle body 20 is provided with a second opening 25 in communication with the bottle cavity 23. The valve body assembly 30 includes a valve cavity 31, a passage 32 and a valve port 33, wherein an end of the valve body assembly 30 is disposed on the first end 201 of the bottle body 20, the valve body assembly 30 is capable of sealing the bottle body 20, and the passage 32 is in communication with the first opening 24 and the valve cavity 31, so that a fluid in the bottle cavity 23 can flow from the bottle cavity 23 into the valve cavity 31 via the passage 32. The valve core assembly 40 is disposed in the valve cavity 31 and is capable of moving in the valve cavity 31 and configured for opening/closing the valve port 33. The coil assembly 50 is sleeved out of the valve body 35 and connected to the bottle body 20, and is configured for controlling movement of the valve core assembly 40. By controlling movement of the valve core assembly 40, the fluid in the bottle body 20 can be controlled to flow out from the first opening 24 into the valve port 33, and a rate of flow of the fluid flowing out of the valve port 33 can be controlled.

Specifically, in the bottle solenoid valve 100 of the present disclosure, the bottle cap 10 includes a covering portion 11 and a wrapping portion 12 connected to the covering portion 11. The covering portion 11 is covered at the second opening 25, and the wrapping portion 12 is detachably connected to the second end 202 of the bottle body 20 and surrounded around a circumference of the second end 202 of the bottle body 20. An inner surface of a sidewall of the wrapping portion 12 is provided with a ventilation channel 13, an end of the ventilation channel 13 is in communication with the bottle cavity 23, and the other end of the ventilation channel 13 is disposed towards the valve body assembly 30 and in communication with atmosphere.

By providing the ventilation channel 13 in communication with atmosphere, the pressure inside the bottle body 20 and the pressure outside the bottle body 20 are balanced. Specifically, the ventilation channel 13 is concealed on the inner surface of the sidewall of the wrapping portion 12 and opposite the valve body assembly 30. Therefore, dusts cannot accumulate at the entrance of the ventilation channel 13, and the covering portion 11 can shelter the ventilation channel 13. Thus, risk of stoppage of the ventilation channel 13 caused by the dusts accumulation or sundries coverage is further eliminated, and the air flowing into the bottle body is reliable and stable, so that products stored in the bottle body 20 for a long time do not have the risk of being polluted by sundries. Furthermore, since the ventilation channel 13 do not have the risk of stoppage caused by the dusts accumulation or the sundries coverage, a ventilation cross section of the ventilation channel 13 can be suitably increased, so as to ensure that the air flows quickly and stably into the bottle body.

In addition, the ventilation channel 13 is disposed on the sidewall of the wrapping portion 12.

The bottle body 20 can be used for containing fluids such as essential oils and the like. By providing the ventilation channel 13 in communication with the atmosphere, the pressure inside the bottle body 20 is balance against the pressure outside the bottle body 20, so that the fluids such as essential oils and the like can smoothly flow out from the first opening 24.

Figure 10:
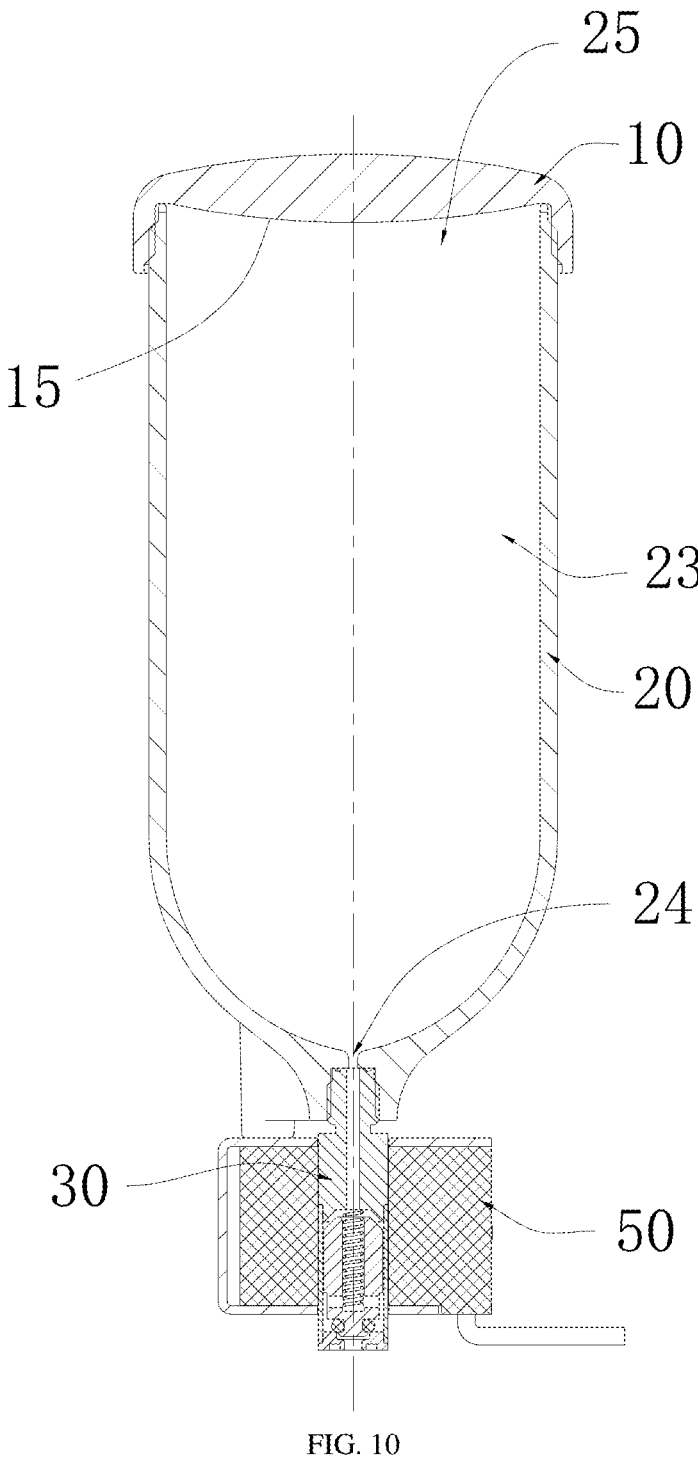
FIG. 10 is a sectional view of a bottle solenoid valve in an embodiment of the present disclosure.
Figure 11:
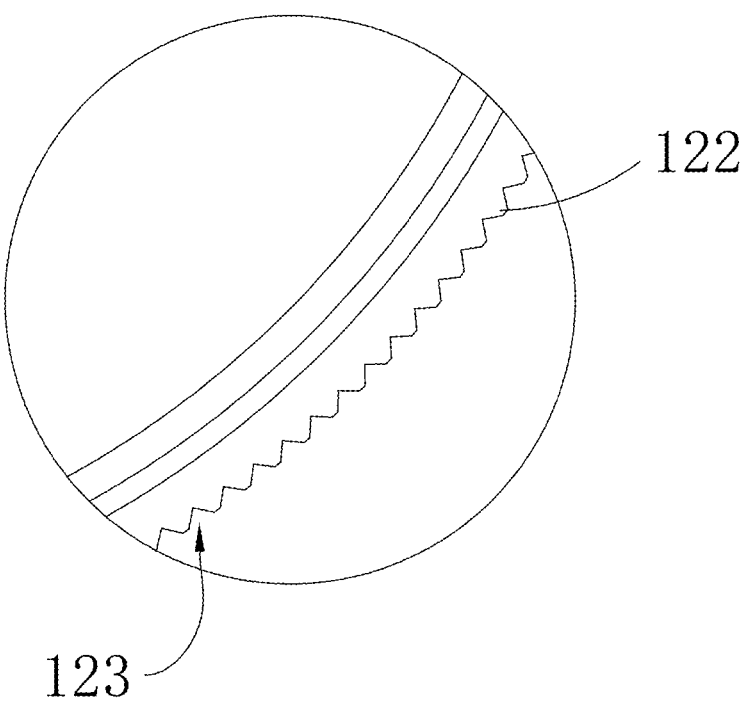
FIG. 11 is a partial enlarged view of C portion in FIG. 8.

In some embodiments, referring to FIG. 10, a guidance portion 15 is defined by a part of a side of the covering portion 11 facing the bottle body 20 protruding out, and is configured for guiding a fluid that flows through the covering portion 11 into the bottle body 20. Thus, that the fluid flows out of the bottle body 20 from the covering portion 11 along the wrapping portion 12 can be effectively avoided, and fluid loss caused by which can be avoided.

Specifically, referring to FIG. 10, since the guidance portion 15 protrudes out from the side of the covering portion 11 facing the bottle body 20, the fluid can be prevented from flowing out of the bottle body 20 from the outer surface of the sidewall of the bottle body 20 along the covering portion 11. Of course, in some embodiments, the structure of the guidance portion and methods for forming the guidance portion are not limited to those described above.

Figure 4:
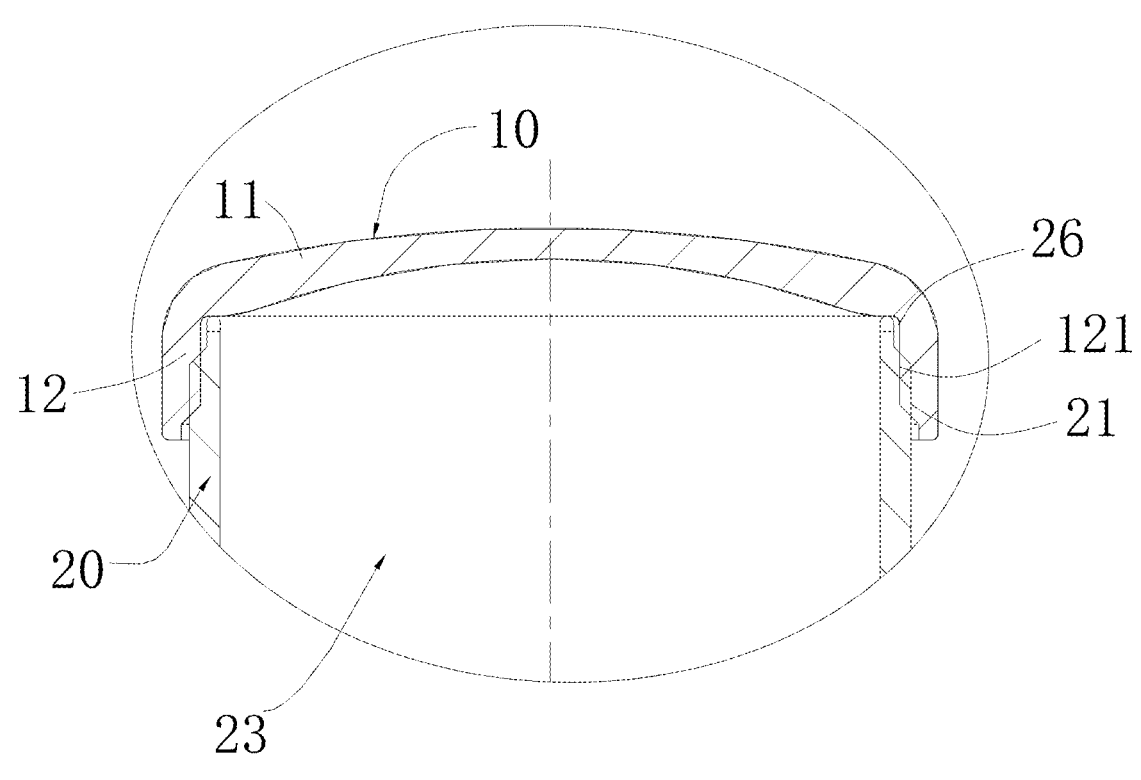
FIG. 4 is a partial enlarged view of A portion in FIG. 3.
Figure 6:
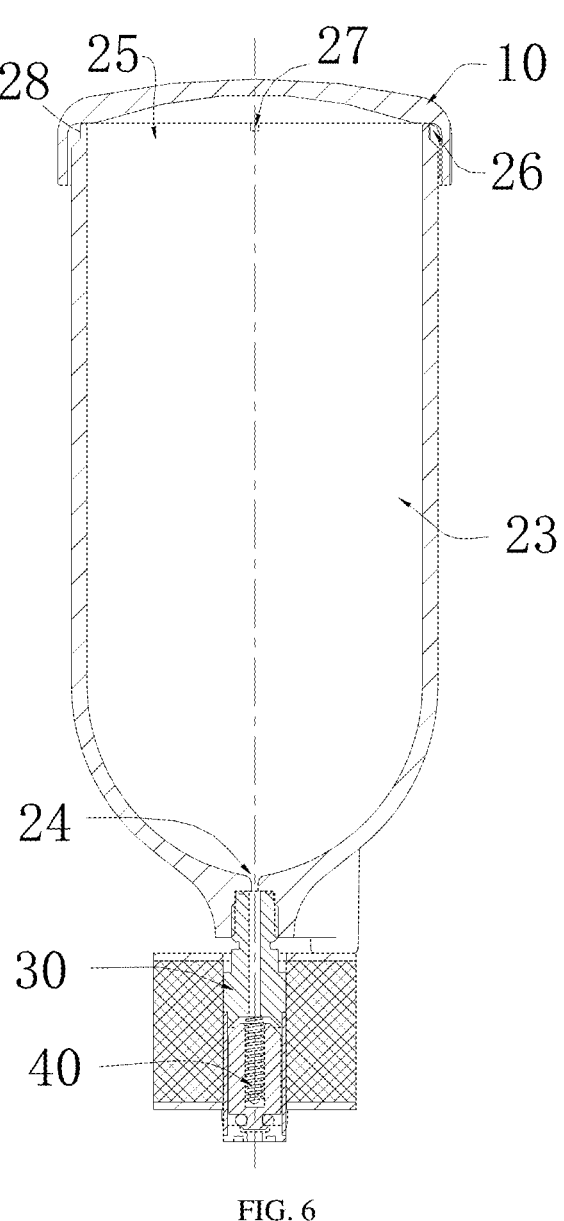
FIG. 6 is a sectional view along B-B line in FIG. 2.
Figure 7:
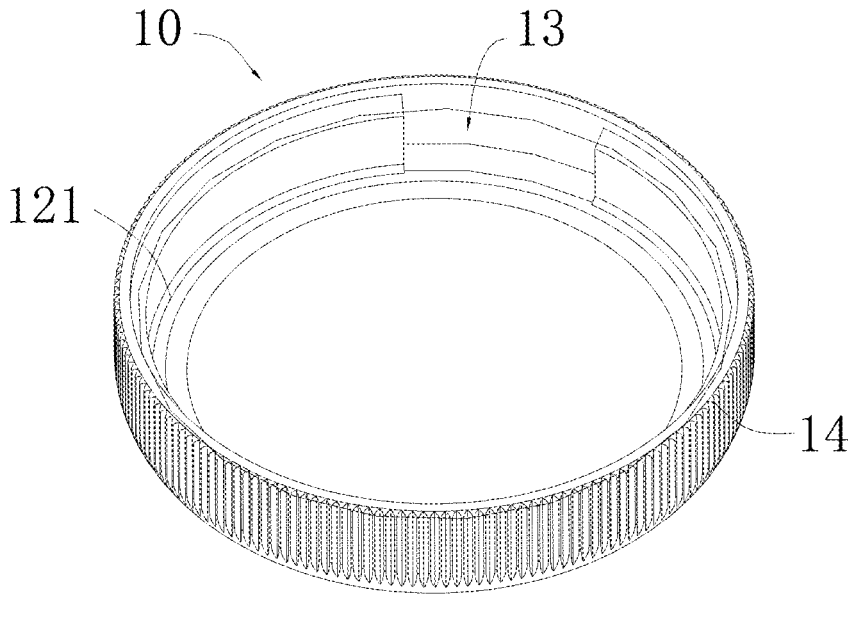
FIG. 7 is a schematic diagram of a bottle cap in an embodiment of the present disclosure.

Referring to FIG. 4, FIG. 6 and FIG. 7, an outer surface of a sidewall of the second end 202 of the bottle body 20 is provided with an avoidance groove 26 and at least one communication hole 27 in communication with the avoidance groove 26 and the bottle cavity 23. When the wrapping portion 12 is connected to the bottle body 20, the inner surface of the sidewall of the wrapping portion 12 and the avoidance groove 26 surround to form a ventilation cavity, and the ventilation channel 13 is in communication with the bottle cavity 23 via the ventilation cavity and the at least one communication hole 27. The avoidance groove 26 is configured for giving way to the threads on the outer surface of the sidewall of the bottle body 20, and insufficient space for airflow flowing caused by threaded connection between the bottle cap 10 and the bottle body 20 can be avoided. The space for the airflow flowing can be enlarged via the avoidance groove 26, and problems of ventilation channel stoppage caused by unduly small airflow flowing space can be avoided.

Figure 9:
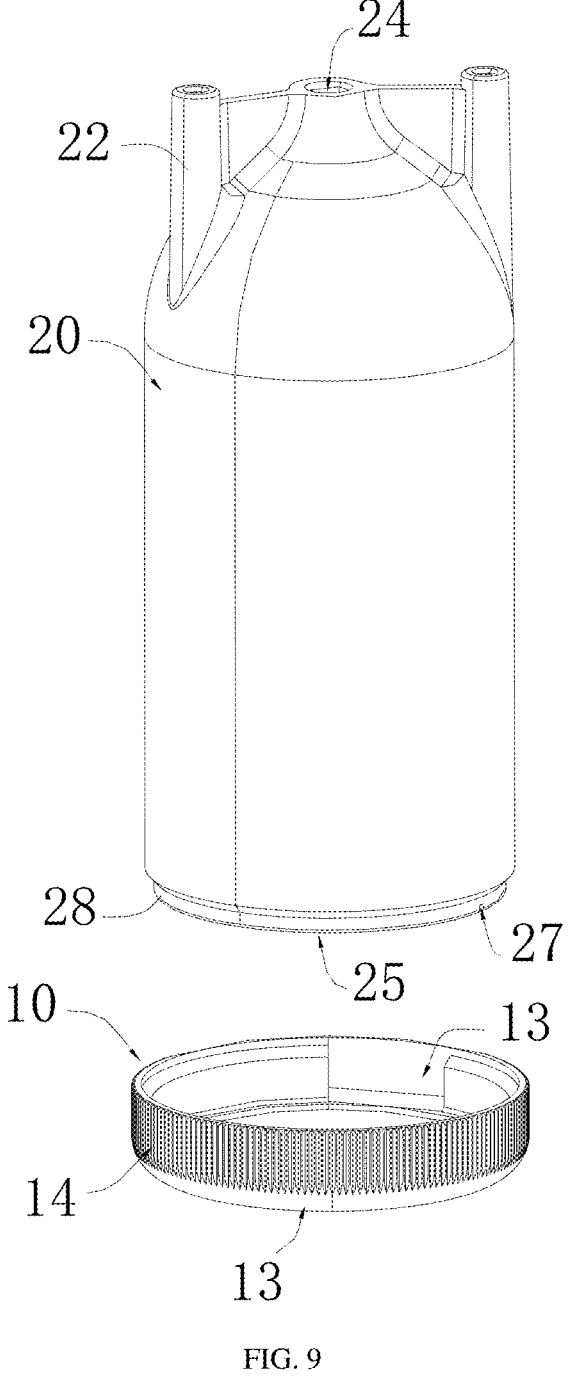
FIG. 9 is a schematic diagram of a bottle body and a bottle cap in FIG. 1.

Furthermore, in the present embodiment, referring to FIG. 6 and FIG. 9, an end of the bottle body 20 adjacent to the bottle cap 10 is a shrinking portion 28. A size of the shrinking portion 28 is smaller than a size of the bottle body 20. Therefore, the shrinking portion 28 and the wrapping portion 12 of the bottle cap 10 surround to form the avoidance groove 26 described above. In this way, the avoidance groove 26 is surrounded along the circumference of the bottle body 20, which facilitates increasing airflow flow area and effectively avoids stoppage. In addition, a shrinking process is simple, so that a processing cost can be lowered. At the same time, since the size of the shrinking portion 28 is smaller than the size of the bottle body 20, the shrinking portion 28 plays a role of guiding in the process of assembling the bottle cap. The shrinking portion 28 guides the bottle cap 10 to cover on the bottle body 20 along the shrinking portion 28, and the bottle cap 10 is not required to align with the bottle body 20, thereby improving the assembly efficiency. Of course, in some embodiments, the method for providing the avoidance groove 26 is not limited to the method described above, and the avoidance groove 26 can be directly processed by a method of milling.

Figure 8:
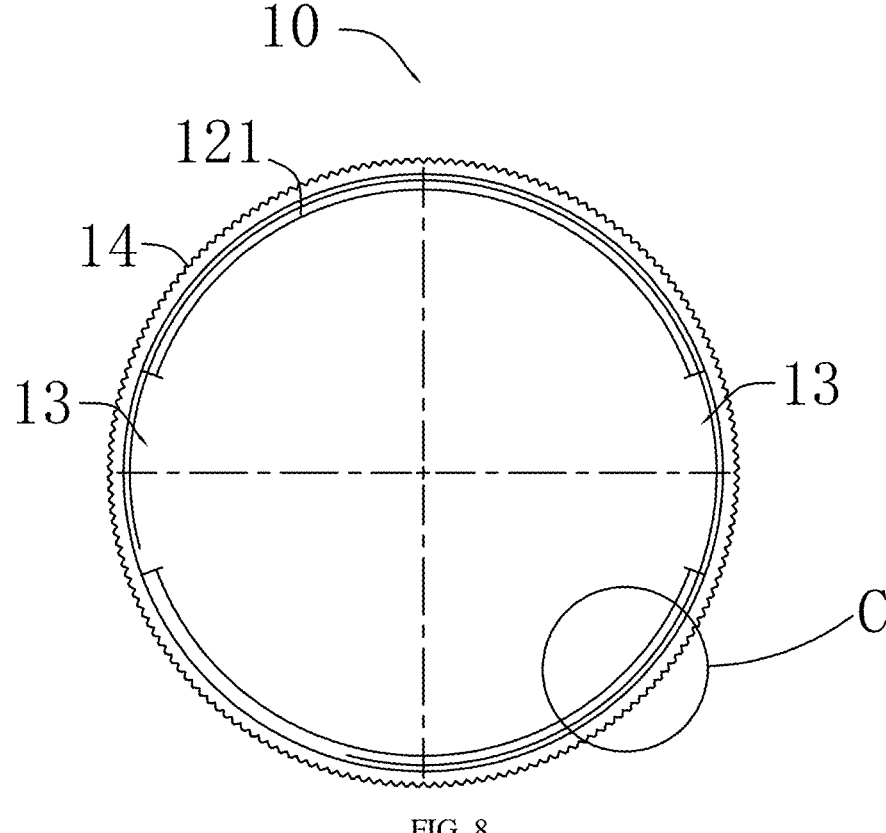
FIG. 8 is a top view of the bottle cap in FIG. 7.

Referring to FIG. 4, FIG. 7 and FIG. 8, the inner surface of the sidewall of the wrapping portion 12 is provided with internal threads 121, the outer surface of the sidewall of the second end 202 of the bottle body 20 is provided with external threads 21, and the wrapping portion 12 is threadedly connected to the bottle body 20 via fit between the internal threads 121 and the external threads 21, wherein the ventilation channel 13 extends along an axis of the internal threads 121 and is disposed on the inner surface of the sidewall of the wrapping portion 12. In other words, the internal threads 121 are segmented by the ventilation channel 13 to form a passage 32 for ventilation, so as to avoid stoppage of the air passage when the bottle body 20 is threadedly connected to the bottle cap 10. In some embodiments, the method for disposing the ventilation channel 13 is not limited to those described above or shown in the figures. For example, the ventilation channel 13 can be disposed along threads of the bottle cap 10.

In the present disclosure, the number of the ventilation channel 13 is multiple, and the plurality of ventilation channels 13 are disposed at intervals along a circumference of the bottle cap 10. Specifically, referring to FIG. 7 and FIG. 8, in the present embodiment, the number of the ventilation channel 13 is two. The two ventilation channels 13 are symmetrically disposed relative to the axis of the bottle body 20, so as to ensure uniform air inflow and air outflow. In some embodiments, the number of the ventilation channel 13 is three, four, and the like.

Referring to FIG. 7 and FIG. 8, the outer surface of the sidewall of the wrapping portion 12 is provided with an antiskid structure 14. The antiskid structure 14 can increase a force of friction while screwing the bottle cap 10, so that the second opening 25 can be closed by screwing the bottle cap 20 or opened by unscrewing the bottle cap 10 with a relative small force. The effort and the time are saved.

In the present embodiment, referring to FIG. 7 and FIG. 8, the antiskid structure 14 includes protrusions 122 protruding from the outer surface of the sidewall of the wrapping portion 12. The plurality of protrusions 122 are disposed along the circumference of the wrapping portion 12, so as to increase the force of friction on the side surface of the wrapping portion 12 in the process of screwing. Of course, in some embodiments, the structure of the antiskid structure 14 is not limited to those described above or in the figures. For example, the antiskid structure 14 includes grooves 123 disposed on an outer surface of a sidewall of the bottle cap 10.

Optionally, referring to FIG. 7 and FIG. 8, the plurality of protrusions 122 are disposed on the outer surface of the sidewall of the wrapping portion 12 along the axis of the bottle body 20. In the process of screwing, the screwing force is perpendicular to each of the plurality of protrusions 122. Therefore, the screwing force can be entirely acted on the bottle cap 10, and the effort and time are saved while screwing to open or close the table cap.

Figure 3:
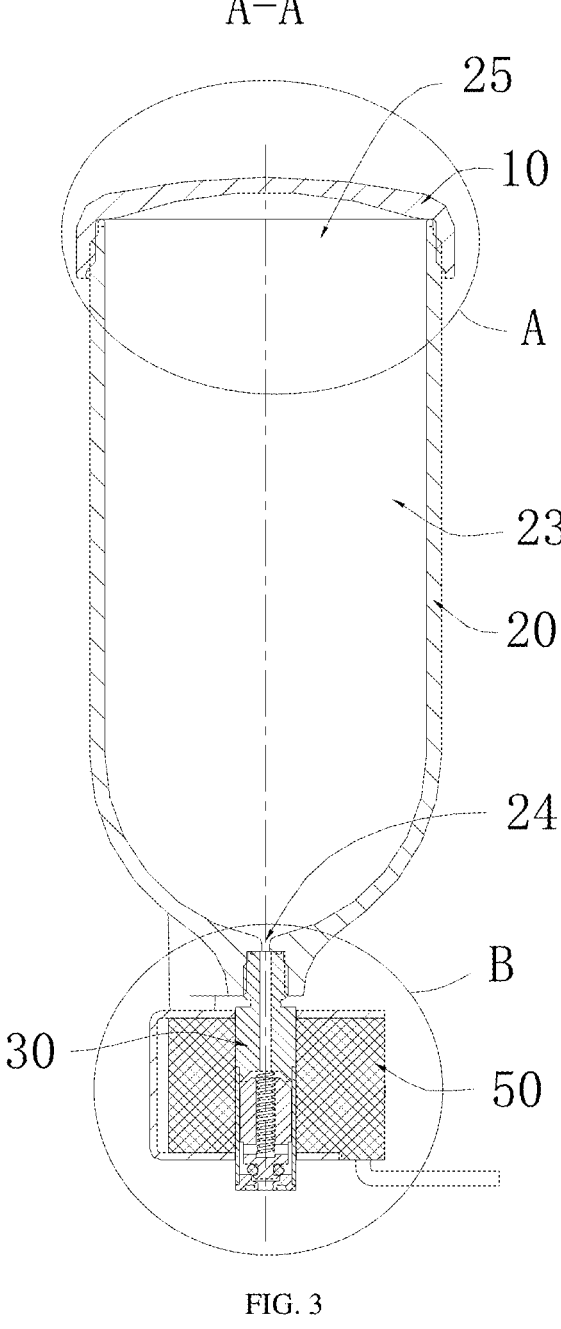
FIG. 3 is a sectional view along A-A line in FIG. 2.
Figure 5:
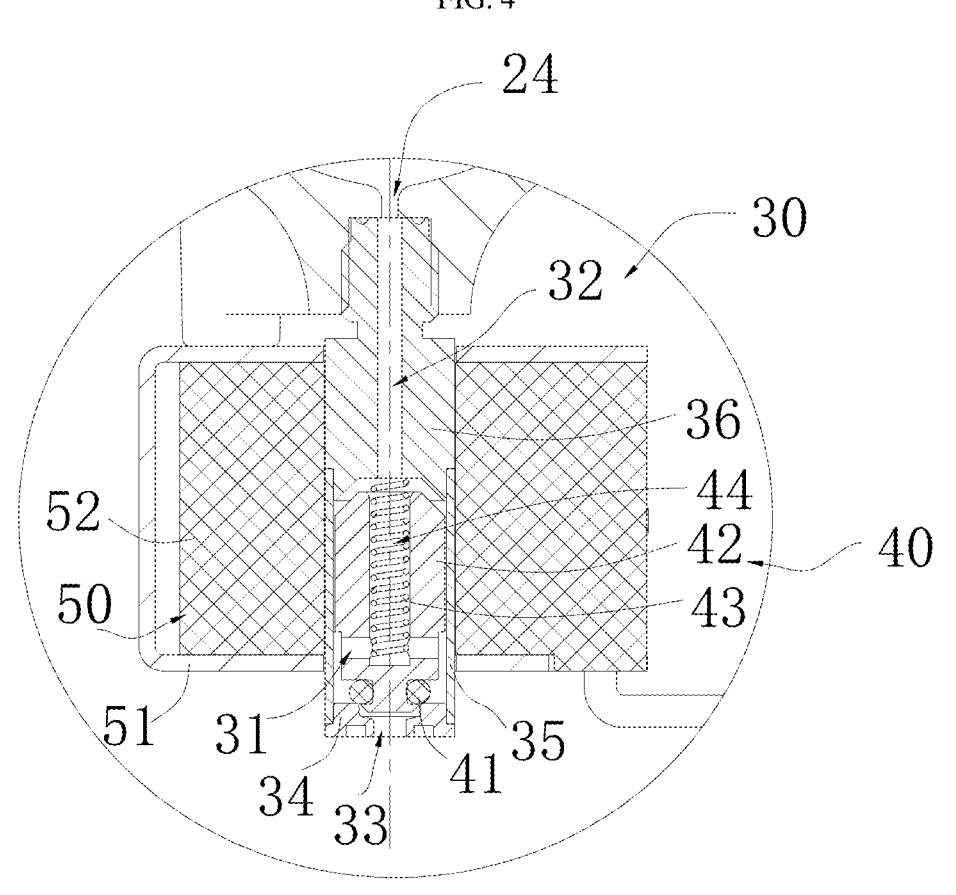
FIG. 5 is a partial enlarged view of B portion in FIG. 3.

Referring to FIG. 3 to FIG. 5, the valve body assembly 30 includes a valve body 35 and an attractor 36. The valve body 35 includes a valve cavity 31 and a valve port 33. The attractor 36 is provided with the passage 32. An end of the attractor 36 is connected to the valve body 35, and the other end of the attractor 36 is sealingly connected to the first end 201 of the bottle body 20. The coil assembly 50 is capable of driving the valve core assembly 40 to move when the coil assembly 50 is charged, so as to control the valve port 33 to open or close and control the degree when the valve port 33 open or closes, thereby controlling the rate of flow of the fluid flowing through the valve port 33.

Referring to FIG. 5, the valve body assembly further includes a valve seat 34. The valve seat 34 is provided with a valve port 33. An end of the valve body 35 away from the attractor 36 is disposed on the valve seat 34.

Referring to FIG. 5, the valve core assembly 40 includes a core iron 42 and an elastic member 43. The core iron 42 is located in the valve cavity 31 and provided with an accommodating cavity 44, and configured for fitting with the attractor 36. The elastic member 43 is disposed in the accommodating cavity 44 and an end of the elastic member 43 extends out of the accommodating cavity 44 and abuts against the attractor 36.

Referring to FIG. 5, the valve core assembly 40 further includes a sealing member 41. The sealing member 41 is sleeved on an end of the core iron 42 away from the attractor 36, and configured for opening or closing the valve port 33 along with movement of the core iron 42. Sealing at the valve port 33 is improved by the sealing member 41, so as to prevent the fluid from leaking from the valve port 33.

Referring to FIG. 1 to FIG. 3, and FIG. 5, the coil assembly 50 includes a fixing frame 51 and a coil 52. The fixing frame 51 is disposed on the bottle body 20. The coil 52 is sleeved on the valve body assembly 30 and fixed to the fixing frame 51. Thus, the coil assembly 50 is stably connected to the valve core assembly 40 and the bottle body 20.

Optionally, the fixing frame 51 is detachably connected to the bottle body 20, so that the bottle body 20, the fixing frame 51, or the valve core assembly 40 disposed on the fixing frame 51 can be independently changed, but not all of them are required to be changed. Thus, the maintenance cost can be lowered.

Referring to FIG. 1 and FIG. 9, the first end 201 of the bottle body 20 is provided with a mounting portion 22. The fixing frame 51 is detachably connected to the mounting portion 22, so as to ensure mounting stability of the fixing frame 51, and avoid leakage of the fluid in the bottle body 20 caused by the fixing frame 51 and the valve core assembly 40 separating from the bottle body 20.

In the present embodiment, referring to FIG. 9, the mounting portion 22 is a convex column disposed at the first end 201 of the bottle body. The convex column and the bottle body 20 can be integrally formed. In this way, the convex column and the bottle body 20 can be ensured to have a relatively high connection strength, so as to ensure that the fixing frame 51 and the valve core assembly 40 can be stably assembled to the bottle body 20.

In view of above, referring to FIG. 1 to FIG. 5, the bottle solenoid valve 100 is a normally closed solenoid valve. The processes of opening or closing the valve port 33 are shown herein.

Firstly, the coil 52 is electrified to generate an electromagnetic field. Then, the electromagnetic field magnetize the attractor 36, the attractor 36 attracts the core iron 42 so as to make the core iron 42 overcome the elastic force of the elastic member 43 and move towards the attractor 36, thereby causing the sealing member 41 to move and open the valve port 33. When the valve port 33 should be closed, electricity supply of the coil 52 is cut off, the attractor 36 loses the magnetic force, the core iron 42 is not attracted by the attractor 36, and an elastic restoring force of the elastic member 43 acts on the core iron 42, so as to push the core iron 42 to move towards the valve port 33 and close the valve port 33. Of course, in some embodiments, the bottle solenoid valve 100 can be set as a normally opened solenoid valve, and positions at which the corresponding elastic member 43 is disposed and processes for opening or closing the solenoid valve are correspondingly changed.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

Those of ordinary skill in the art should realize that the above embodiments are only used to illustrate the present disclosure and are not intended to be used as a limitation of the present disclosure. As long as appropriate changes and variations to the above embodiments are made within the scope of the present disclosure within the spirit and substance of the present disclosure, they fall within the scope of the claimed protection of the present disclosure.

What is claimed is:

1. A bottle solenoid valve, comprising, a bottle body with a first end and a second end opposite to each other, wherein a bottle cavity is provided inside the bottle body, the first end of the bottle body is provided with a first opening in communication with the bottle cavity, and the second end of the bottle body is provided with a second opening in communication with the bottle cavity;

a valve body assembly comprising a valve cavity, a passage and a valve port, wherein an end of the valve body assembly is disposed on the first end of the bottle body, the valve body assembly is capable of sealing the bottle body, and the passage is in communication with the first opening and the valve cavity;

a valve core assembly disposed in the valve cavity, wherein the valve core assembly is capable of moving in the valve cavity and configured for opening/closing the valve port; and a bottle cap comprising a covering portion and a wrapping portion connected to the covering portion, wherein the covering portion is covered at the second opening, and the wrapping portion is detachably connected to the second end of the bottle body and surrounded around a circumference of the second end of the bottle body, wherein an inner surface of a sidewall of the wrapping portion is provided with a ventilation channel, an end of the ventilation channel is in communication with the bottle cavity, and the other end of the ventilation channel is disposed towards the valve body assembly and in communication with atmosphere;

wherein the valve body assembly comprises a valve body having the valve cavity and the valve port; and an attractor provided with the passage, an end of the attractor is connected to the valve body, and the other end of the attractor is sealingly connected to the first end of the bottle body, wherein the attractor is configured for attracting the valve core assembly to move.

2. The bottle solenoid valve of claim 1, wherein an outer surface of a sidewall of the second end of the bottle body is provided with an avoidance groove and at least one communication hole in communication with the avoidance groove and the bottle cavity;

when the wrapping portion is connected to the bottle body, the inner surface of the sidewall of the wrapping portion and the avoidance groove surround to form a ventilation cavity, and the ventilation channel is in communication with the bottle cavity via the ventilation cavity and the at least one communication hole.

3. The bottle solenoid valve of claim 1, wherein the inner surface of the sidewall of the wrapping portion is provided with internal threads, an outer surface of the sidewall of the second end of the bottle body is provided with external threads, and the wrapping portion is threadedly connected to the bottle body via fit between the internal threads and the external threads, wherein the ventilation channel extends along an axis of the internal threads and is disposed on the inner surface of the sidewall of the wrapping portion.

4. The bottle solenoid valve of claim 1, wherein the inner surface of the sidewall of the wrapping portion is provided with a plurality of ventilation channels, and the plurality of ventilation channels are disposed at intervals along a circumference of the bottle cap.

5. The bottle solenoid valve of claim 1, wherein an outer surface of the sidewall of the wrapping portion is provided with an antiskid structure.

6. The bottle solenoid valve of claim 5, wherein the antiskid structure comprises protrusions protruding from the outer surface of the sidewall of the wrapping portion; or, the antiskid structure comprises grooves disposed on an outer surface of a sidewall of the bottle cap.

7. The bottle solenoid valve of claim 1, wherein a guidance portion is defined by a part of a side of the covering portion facing the bottle body protruding out, and is configured for guiding a fluid that flows through the covering portion into the bottle body.

8. The bottle solenoid valve of claim 1, wherein the valve core assembly comprises a core iron, which is located in the valve cavity and provided with an accommodating cavity, and configured for fitting with the attractor;

a sealing member, which is sleeved on an end of the core iron away from the attractor, and configured for opening or closing the valve port; and, an elastic member, which is disposed in the accommodating cavity and an end of the elastic member extends out of the accommodating cavity and abuts against the attractor.

9. The bottle solenoid valve of claim 1, further comprising a coil assembly, wherein the coil assembly is sleeved out of the valve body assembly and connected to the bottle body, and is configured for controlling movement of the valve core assembly.

10. The bottle solenoid valve of claim 9, wherein the coil assembly comprises a fixing frame detachably disposed on the bottle body; and a coil sleeved on the valve body assembly and fixed to the fixing frame.

11. A bottle solenoid valve, comprising, a bottle body with a first end and a second end opposite to each other, wherein a bottle cavity is provided inside the bottle body, the first end of the bottle body is provided with a first opening in communication with the bottle cavity, and the second end of the bottle body is provided with a second opening in communication with the bottle cavity;

a valve body assembly comprising a valve cavity, a passage and a valve port, wherein an end of the valve body assembly is disposed on the first end of the bottle body, the valve body assembly is capable of sealing the bottle body, and the passage is in communication with the first opening and the valve cavity;

a valve core assembly disposed in the valve cavity, wherein the valve core assembly is capable of moving in the valve cavity and configured for opening/closing the valve port;

a bottle cap comprising a covering portion and a wrapping portion connected to the covering portion, wherein the covering portion is covered at the second opening, and the wrapping portion is detachably connected to the second end of the bottle body and surrounded around a circumference of the second end of the bottle body, and a coil assembly, wherein the coil assembly comprises a fixing frame detachably disposed on the bottle body; and a coil sleeved on the valve body assembly and fixed to the fixing frame, and the coil assembly is sleeved out of the valve body assembly and connected to the bottle body, and is configured for controlling movement of the valve core assembly, wherein an inner surface of a sidewall of the wrapping portion is provided with a ventilation channel, an end of the ventilation channel is in communication with the bottle cavity, and the other end of the ventilation channel is disposed towards the valve body assembly and in communication with atmosphere.

12. The bottle solenoid valve of claim 11, wherein an outer surface of a sidewall of the second end of the bottle body is provided with an avoidance groove and at least one communication hole in communication with the avoidance groove and the bottle cavity;

when the wrapping portion is connected to the bottle body, the inner surface of the sidewall of the wrapping portion and the avoidance groove surround to form a ventilation cavity, and the ventilation channel is in communication with the bottle cavity via the ventilation cavity and the at least one communication hole.

13. The bottle solenoid valve of claim 11, wherein the inner surface of the sidewall of the wrapping portion is provided with internal threads, an outer surface of the sidewall of the second end of the bottle body is provided with external threads, and the wrapping portion is threadedly connected to the bottle body via fit between the internal threads and the external threads, wherein the ventilation channel extends along an axis of the internal threads and is disposed on the inner surface of the sidewall of the wrapping portion.

14. The bottle solenoid valve of claim 11, wherein the inner surface of the sidewall of the wrapping portion is provided with a plurality of ventilation channels, and the plurality of ventilation channels are disposed at intervals along a circumference of the bottle cap.

15. The bottle solenoid valve of claim 11, wherein an outer surface of the sidewall of the wrapping portion is provided with an antiskid structure.

16. The bottle solenoid valve of claim 15, wherein the antiskid structure comprises protrusions protruding from the outer surface of the sidewall of the wrapping portion; or, the antiskid structure comprises grooves disposed on an outer surface of a sidewall of the bottle cap.

17. The bottle solenoid valve of claim 11, wherein a guidance portion is defined by a part of a side of the covering portion facing the bottle body protruding out, and is configured for guiding a fluid that flows through the covering portion into the bottle body.

\* \* \* \* \*